United States Patent [19]
Bini

[11] Patent Number: 4,700,374
[45] Date of Patent: Oct. 13, 1987

[54] MOBILE TELEPHONE LOCATION SYSTEM

[75] Inventor: Aldo Bini, Rome, Italy

[73] Assignee: Alcatel N.V., Amsterdam, Netherlands

[21] Appl. No.: 747,510

[22] Filed: Jun. 21, 1985

[30] Foreign Application Priority Data

Jul. 6, 1984 [IT] Italy .................. 21774 A/84

[51] Int. Cl.⁴ .............................................. H04Q 7/04
[52] U.S. Cl. ......................................... 379/60; 455/12
[58] Field of Search ................ 179/2 E, 2 EB, 2 EC; 455/12-13, 32, 34; 379/58-60

[56] References Cited

U.S. PATENT DOCUMENTS

| 3,609,246 | 9/1971 | Muller et al. | 379/59 |
| 4,178,476 | 12/1979 | Frost | 379/59 |
| 4,424,417 | 1/1984 | Chavey et al. | 370/96 |

FOREIGN PATENT DOCUMENTS

| 0137865 | 4/1985 | European Pat. Off. | 455/12 |
| 0144665 | 6/1985 | European Pat. Off. | 379/58 |

OTHER PUBLICATIONS

Billström, "A Public Automatic Mobil Telephone System", *Ericsson Review*, vol. 57, No. 1 (1980), pp. 26–35.
Kammerlander, "C900—An Advanced Mobile Radio Telephone System with Optimum Frequency Utilization", *IEEE Journal on Selected Areas in Communications*, vol. SAC-2, No. 4 (Jul. 1984), pp. 589–597.

Primary Examiner—Gene Z. Rubinson
Assistant Examiner—Mark E. Ham
Attorney, Agent, or Firm—Christie, Parker & Hale

[57] ABSTRACT

A mobile telephone location system is provided wherein a plurality of mobile telephone exchanges, each of which controls an area and is in a position to monitor the presence of mobile telephone units within its own area, are connected with a national center. The national center is capable of receiving requests for the location of mobile telephone units from each of the mobile telephone exchanges and transmit location information via satellite to all of the mobile telephone exchanges within the system. The mobile telephone exchange in whose area the paged mobile telephone unit is located sends location information to the national center or directly to the originating mobile telephone exchange. This location information contains information pertaining to the identity of the mobile telephone exchange and the mobile telephone. This data is transmitted by the national center to the mobile telephone exchange which issued the request enabling the exchange to make the connection.

5 Claims, 12 Drawing Figures

MOBILE TELEPHONE LOCATION SYSTEM

BACKGROUND OF THE INVENTION

The invention relates to a system and a procedure for locating a mobile telephone within a wide geographic surface covered by a mobile telephone service network.

Mobile telephone service is steadily expanding and it is estimated that the number of mobile subscribers will increase on a world-wide level by an order of magnitude within the next ten years.

With the expansion of the service, the problem of locating a mobile subscriber moving from one area to another (roamer) within the range of a wide geographic surface has become of primary importance.

Different mobile telephone systems are presently available. An example of such a system is the cellular one, described in "The Bell System Technical Journal", January 1979 issue, vol. 58, no 1, page 1-269, to which the reader is referred for further details. This system allows the location of a mobile unit or subscriber within the range of a single area divided into cells, but does not tackle the problem of locating any such vehicle in a very large surface which includes several areas.

A known solution to the problem is based on the mobile unit sending its identity signal (and consequently notifying its presence) to the different mobile telephone exchanges (CM) as it crosses the respective areas. Each CM exchange will then inform all the other CM exchanges, provided with a memory, of the presence of the mobile unit at that particular moment. When the mobile unit crosses over into another area, the associated CM exchange, upon receiving an identity signal from the telephone unit, will transmit it to all the other CM exchanges together with its own identity signal, for the purpose of updating the mobile unit's position.

It is obvious that this system can only operate with a limited number of subscribers since it involves the processing by the CM exchanges of a considerable amount of data. This data may turn out to be completely useless should the mobile subscriber receive no calls.

Other solutions are based on the mobile units identity and position messages sent by the exchanges whose areas are crossed by the specific unit to a single center. This center may be the center to which the unit is assigned.

Any CM exchange whic contacts this center may receive the information required for making the connection. In this case too a certain amount of data must be exchanged. The data exchanged is less than in the previously described case, but is just as useless if the mobile subscriber receives no call.

Systems using this solution are the Nordic Mobile Telephone, a Japanese system iillustrated in the document ISS'84 Florence, section 32-B, paper 4, and others.

SUMMARY OF THE INVENTION

The main object of this invention is to provide a system and a procedure allowing the location of a mobile telephone, moving with the unit energized within the range of a geographic surface and crossing several areas, to be determined, there being no need to advise one or all the other mobile exchanges each time the vehicle enters a new area without making or receiving a call.

Another object of this invention is to provide a system as above which is simple in design and is highly flexible with the possibility of allowing the mobile telephone service to be extended to more than one Country.

These and other objects shall become evident upon consideration of the present disclosure.

An advantage offered by the present invention is that the amount of information exchanged by the mobile telephone exchanges CM required to locate a mobile unit, moving within the range of a geographic surface covered by a mobile telephone service and crossing several areas, is minimized.

The system disclosed make maximum use of existing structures and offers the possibility of easily extending the service to an ever-increasing number of subscribers.

The possibility of the system being compatible, even if partially, with existing mobile telephone systems can not be excluded.

Finally, this system affords the possibility of using the same or similar numbering system of the existing network.

Further features and advantages of this invention will become evident from the following description of several embodiments illustrated in the enclosed drawings, where:

BRIEF DESCRIPTION OF THE DRAWINGS

FIGS. 3a to 3j show schematically the possible connections between a mobile unit and fixed subscribers.

DESCRIPTION OF THE PREFERRED EMBODIMENTS

Figure 1:
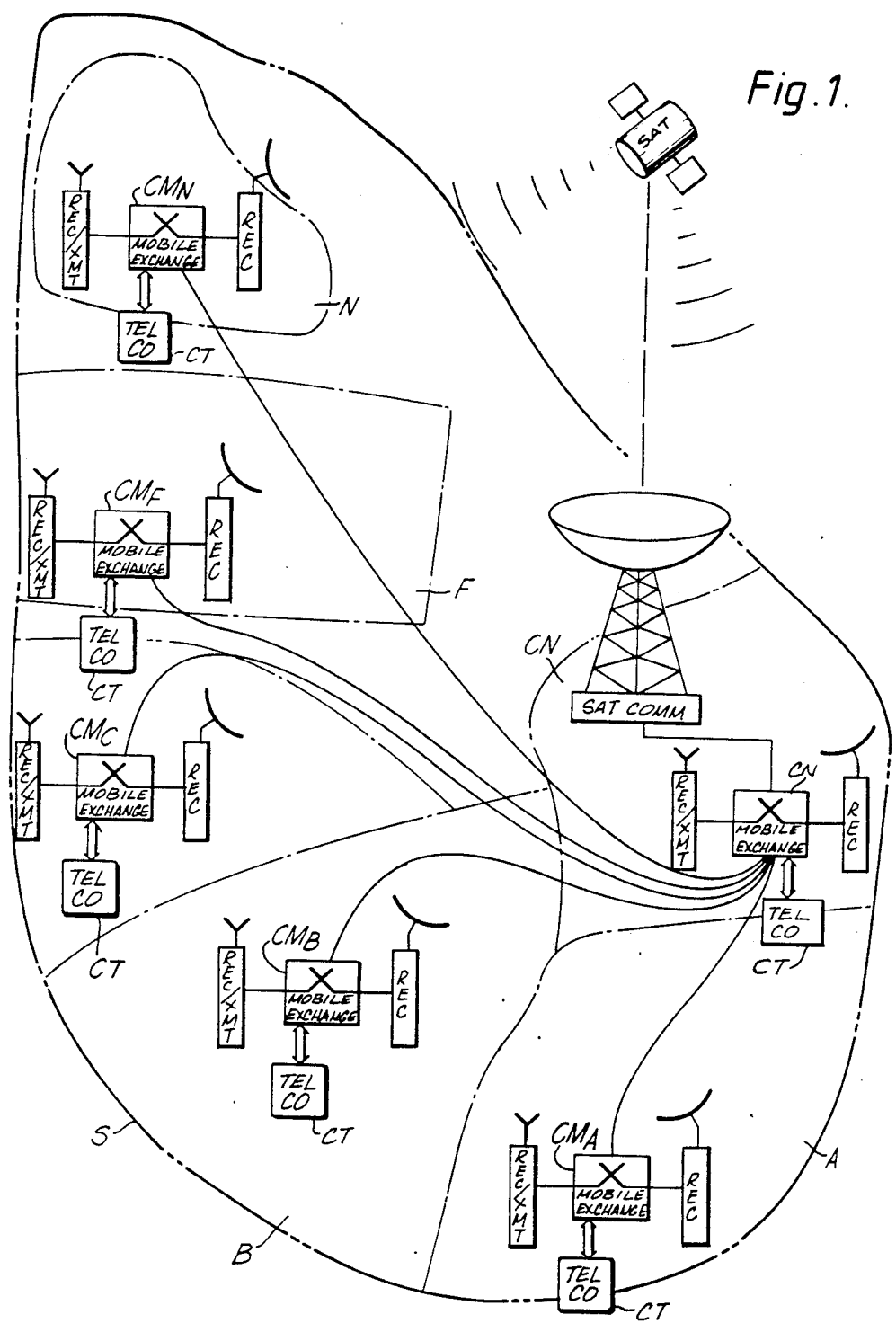
FIG. 1 shows schematically the structural arrangement of the system according to the invention.
Figure 2:
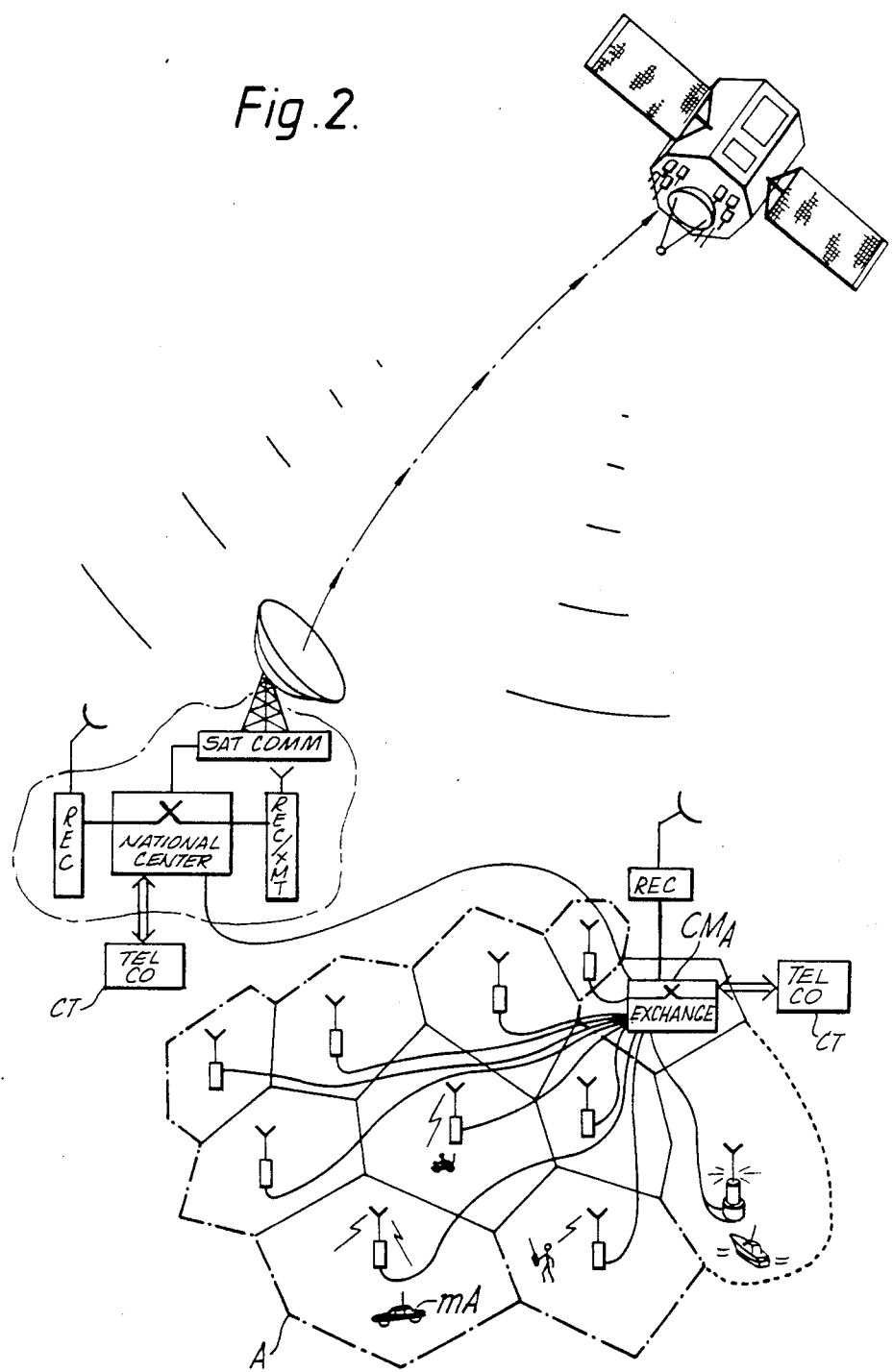
FIG. 2 is a development of FIG. 1 and shows the division of an area into cells.

In FIGS. 1 and 2 the following reference characters have the following meaning:

S shows the geographic surface covered by a mobile telephone service,

A,B, . . . , N are the mobile telephone service areas into which the surface S is divided, $CM_A$, $CM_B$, . . . , $CM_N$ are the mobile telephone exchanges associated with the areas A,B, . . . , N, respectively, and $m_A$, $m_B$, . . . $m_N$ are the mobile telephone subscribers assigned, in as far as the telephone numbering is concerned, to the areas A,D,N, respectively.

All the mobile telephone exchanges CM are connected, with a national center CN additionally acting as a mobile telephone exchange for the area in which it is located. Connections between the mobile telephone exchanges CM and the national center CN may be established either directly or indirectly via a data transmission network which may consist of existing common channel signalling systems.

In addition, each exchange is connected with the national telephone network.

Each exchange monitors the presence of mobile units within its own area and is unaware of the position of such units in other areas.

Let us assume that a mobile unit $m_A$ (belonging to the area A) leaves its own area and is switched On when reaching the area B. When unit MA is switched On its identity signal is sent to the exchange $CM_B$. This identity signal is automatically repeated by unit $m_A$ on a periodic basis since $CM_B$ erases, on a timed basis, the indication of presence of units such as $m_A$ from its memory. The indication of repetition rate for automatically sending the repeats of the identity signal may be very low.

The exchange $CM_B$ does not transmit the identity signal of unit $m_A$ to any other exchange so that no data exchange takes place between the different telephone exchanges CM but only between the mobile subscriber $m_A$ and the telephone exchange $CM_B$ in whose area the mobile subscriber $m_A$ is located at that time.

To set-up a call originating from a mobile unit or fixed subscriber of the surface S when $m_A$ is, for instance, in the area B, the procedure is as follows:

1. the call is directed to the telephone exchange $CM_A$, i.e. the mobile subscriber is called at his own telephone number or at a telephone number which characterizes him in a univocal manner,
2. $CM_A$, having no information in its memory as to the presence of $m_A$ in its own area, transmits a location request to the national center CN. The request includes the mobile subscriber's identification number, the area to which he belongs and other information that may be useful for making the connection,
3. the national center CN broadcasts the paging message to all the mobile exchanges CM in the area S.
4. all the exchanges receive the paging message,
5. the national center CN will only receive one reply, in this case from $CM_B$ in whose area the paged mobile subscriber is located at that particular moment,
6. CN transmits the information regarding mobile unit $m_A$ to the mobile exchange $CM_A$,
7. $CM_A$, having received from CN the information on the location of the mobile subscriber is now in a position to make the connection with mobile unit $m_A$.

A different structural arrangement of the data network, e.g. a mesh network, would allow the direct transmission of data regarding the mobile unit $m_A$ locationn from $CM_B$ to $CM_A$.

The paging message may be relayed by the CN center to all the S area CM exchanges in the following manner:

(a) by using the existing data transmission network or common channel of signalling systems as indicated in FIGS. 3c, 3e, 3h, 3j by a dashed line, such networks being suitably strengthened,
(b) via radio transmission center(s).

A particularly advantageous solution in case of wide geographic surface is given by the use of a geostationary satellite.

This solution will minimize the cost of the transmission system, as compared with that of a terrestrial data transmission network, without causing traffic problems in the satellite.

Possible connections between subscribers are shown in Table 1, where:

$m_A$, $m'_A$ are mobile subscribers belonging to the area A,
$m_B$ is a mobile subscriber belonging to the area B,
m is a non-specific subscriber who originates traffic in the area A,
$f_A$, $f_B$ are fixed subscribers.

TABLE 1

| | from A | towards a Area to which the called subscriber belongs | b Other areas |
|---|---|---|---|
| 1 | $m_A$ m | $f_A, f_B$ | / |
| 2 | $m_A$ m | $m'_A$ | $m'_A$ |
| 3 | $m_A$, m | $m_B$ | $m_B$ |
| 4 | $f_A$ | $m_A$ | $m_A$ |
| 5 | $f_A$ | $m_B$ | $m_B$ |

The following is the meaning of the table: for instance: line 3 means that a mobile subscriber $m_A$, belonging to A, or a non-specific mobile subscriber m who happens to be in A, may call the mobile subscriber $m_B$ who at that particular time may either be in his own area B (column a) or outside of his area (column b).

The examples of the various cases are shown in the FIGS. 3a to 3j and refer to the case in which the data transmission network between the different CMs has a star-shaped structure.

Figure 3A:
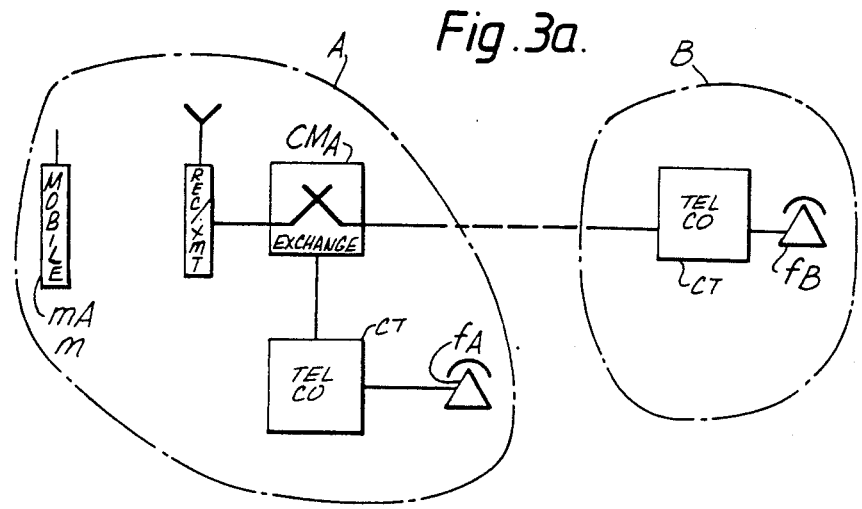
Figure 3B:
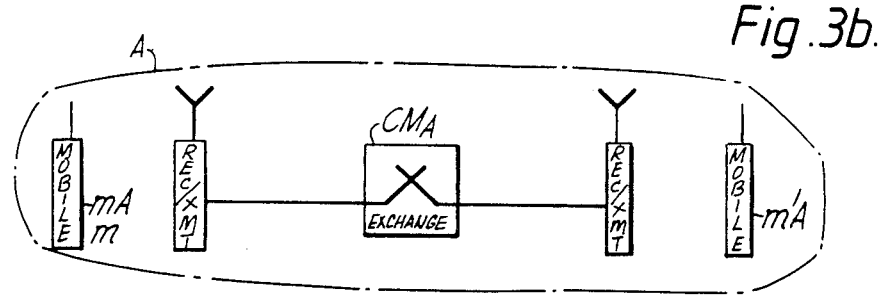

FIGS. 3a and 3b refer to the cases 1a and 2a, respectively, of Table 1 and are self-explanatory.

Figure 3C:
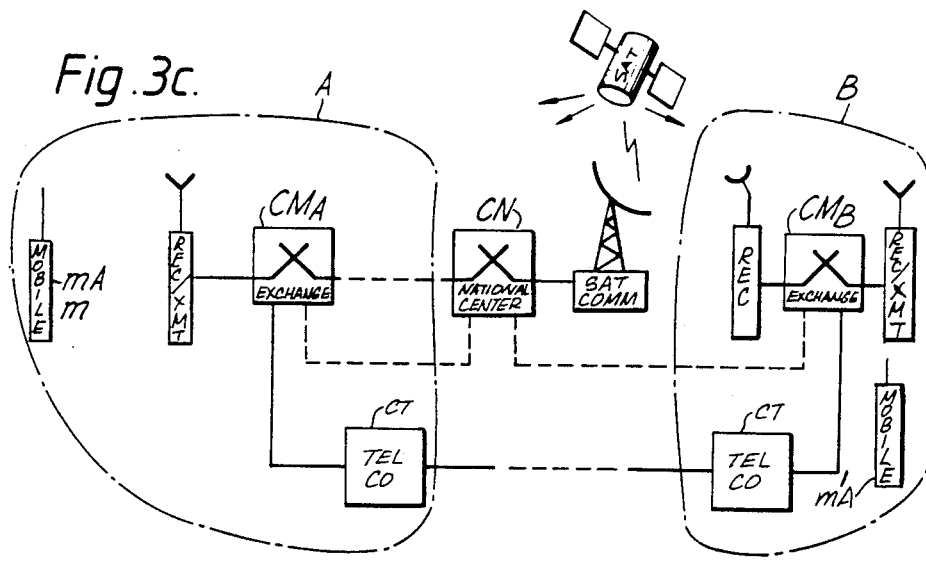

FIG. 3c refers to case 2b in the table in which a mobile subscriber $m_A$ of the area A (or a non-specific mobile subscriber m who originates traffic in A) is calling a mobile subscriber ($m'_A$) of the area A who is outside his own area, e.g. in the area B.

In this case, the mobile exchange $CM_B$ provisionally assigns the mobile subscriber $m'_A$ a number of its own area so as to allow, if required, the routing of the call over the existing network via telephone exchanges CT.

Figure 3D:
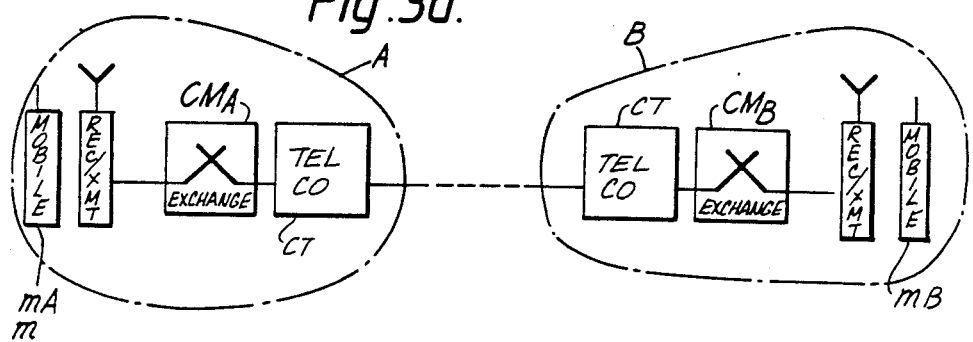

FIG. 3d refers to case 3a of Table 1 and requires no further comments.

Figure 3E:
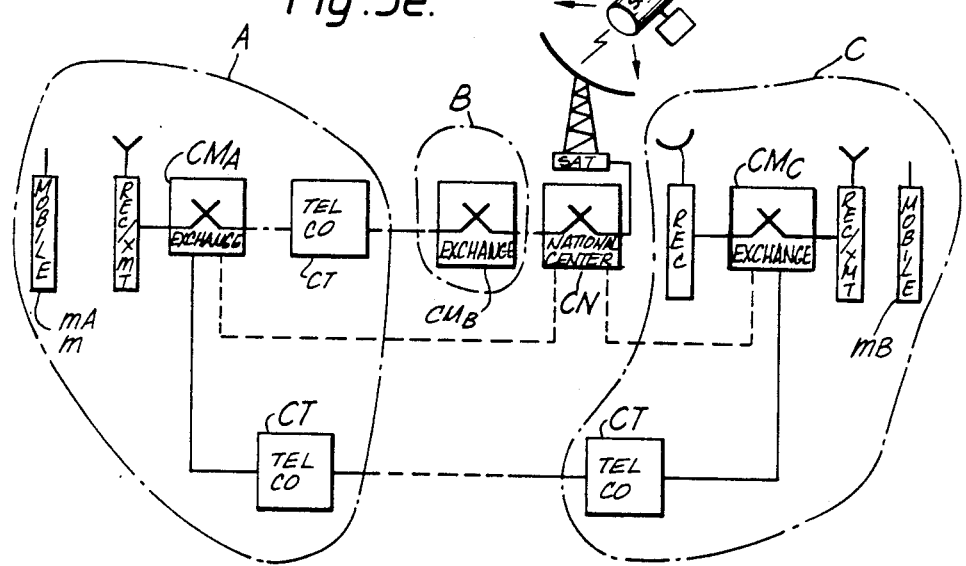

FIG. 3e) refers to case 3b in Table 1 in which a subscriber of the area A is calling a mobile subscriber $m_B$ of the area B who is outside his own area, (e.g. in the area C). Also in this case the exchange $CM_C$ provisionally assigns a number of its own area to $m_B$, as in the case shown in FIG. 3C).

Figure 3F:
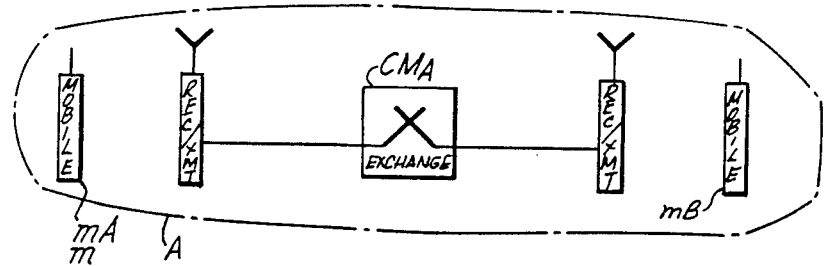

FIG. 3f) refers to a particular case of FIG. 3e,) in which the called subscriber $m_B$ is in the same area as the calling subscriber.

Figure 3G:
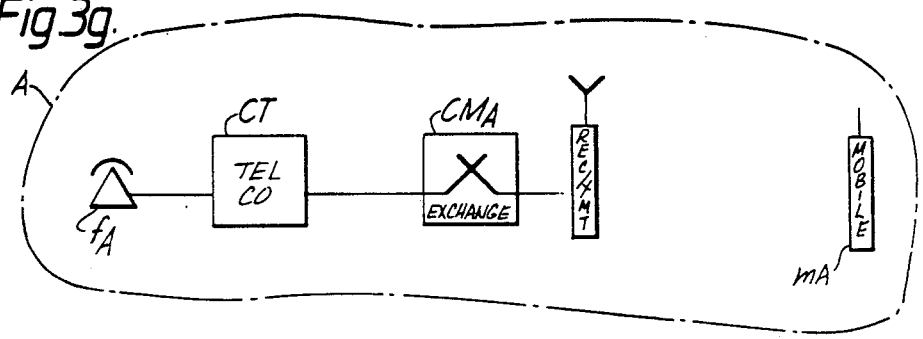

FIG. 3g) refers to the case of a call from a fixed subscriber to a mobile subscriber in his own area (case 4a of Table 1).

Figure 3H:
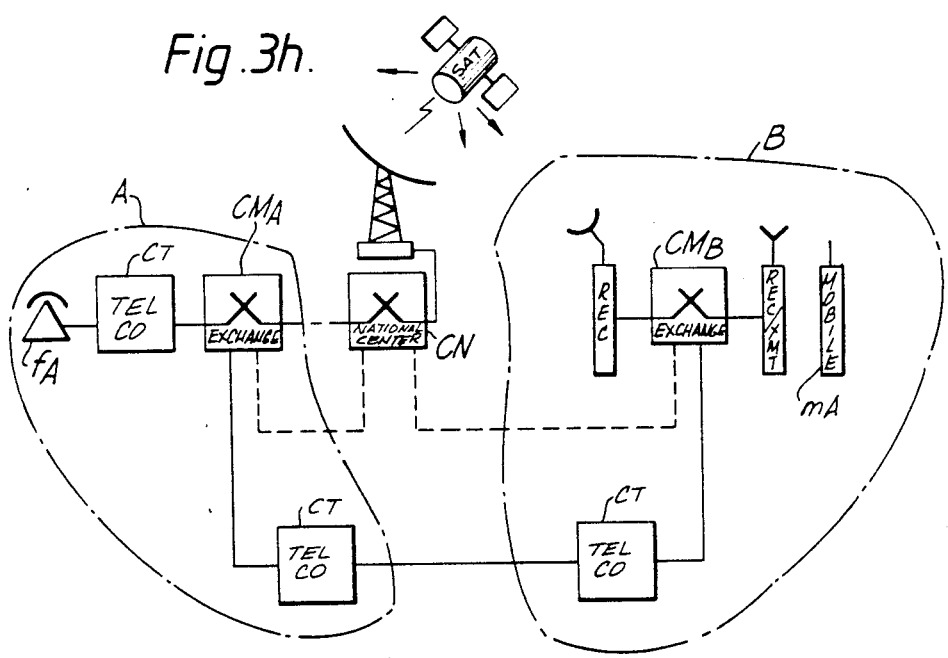

FIG. 3h) refers to case 4b in Table 1 in which a fixed subscriber ($f_A$) of area A is calling a mobile subscriber $m_A$ who is out of his own area. In this case the calling subscriber is expecting a "local" connection which may however become, because of the mobility of the called-up party, a long distance call. The exchange $CM_A$ will consequently send the calling subscriber a particular tone or a message to indicate this fact.

Figure 3I:
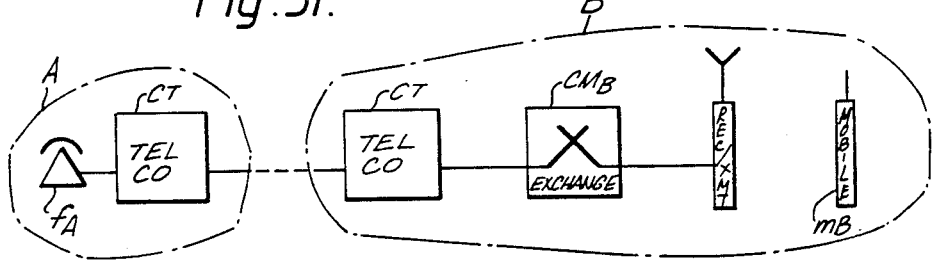
Figure 31:
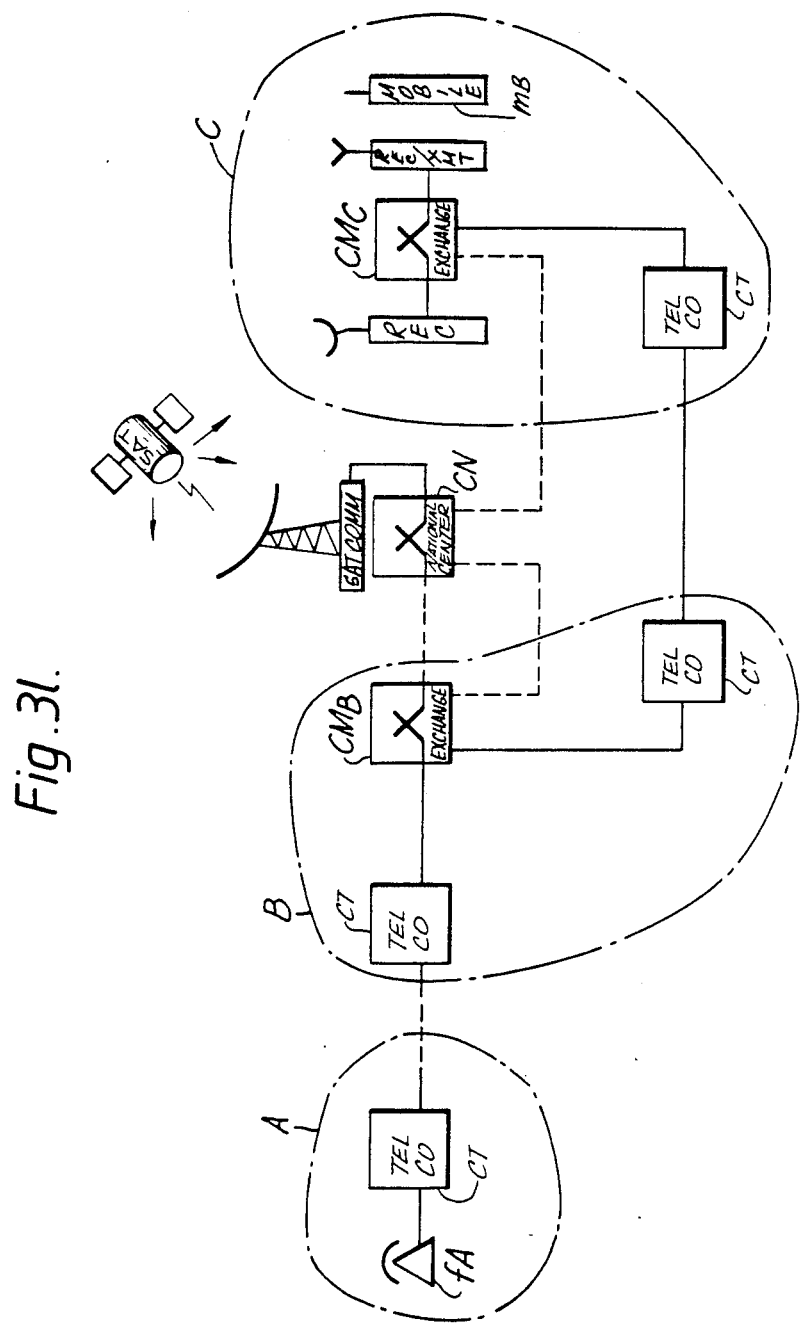

FIG. 3i) refers to case 5a of Table 1, in which a fixed subscriber ($f_A$) of area A is calling a mobile subscriber $m_B$ in his own area B. In this case the charge may be the same as that of the fixed network.

Finally, FIG. 3l) refers to case 5b in Table 1, in which a fixed subscriber ($f_A$) of area A is calling a mobile subscriber $m_B$ who is out of his own area.

In order to avoid an A-B-C-type connection which may be unnecesarily long, especially if C is very close to or coincides with A, a solution may be afforded by the intervention of the operator who, after having ascertained the identity of both the calling and called-up subscriber, makes the proper connection both as regards routing and charges.

The request for the operator's intervention may take place automatically.

From what has been said above and illustrated in the Table 1, and in FIGS. 3a–3j, it follows that the traffic concerning the satellite is only a part of the total traffic. In fact the satellite traffic only concerns the calls made by fixed and mobile subscribers to mobile subscribers who at that particular time are outside their own area (box 2-b, 3-b, 4-b, 5-b in Table 1 and FIGS. 3c, 3e, 3h, 3j).

The lack of mobile telephone service traffic data only allows very approximate estimates.

Let us assume that the traffic for which the satellite must relay paging messages amounts to $10^4$. This corresponds to several hundreds of thousands of mobile subscribers. Since mobile subscribers are only a small percentage of the total subscribers, we are dealing with a Country (or Countries), having several tens of millions of subscribers.

Let us now estimate the paging traffic:
total traffic $10^4$
duration of each conversation 3 minutes
number of calls during the peak hour $$\frac{10^4(60)}{3} = (200)10^3$$

Assuming that 100 bits are required to transmit the identity of a mobile subscriber from the satellite to the different CMs, we have:

bits in the peak hour $100(200)10^3 = 20(10^6)$ bits/hr
bits/sec $20(10^6) \div 3600 = 5.5$ Kbits/s This result shows that the speed required to transmit paging messages from the satellite to the CMs may be comparatively low. In other words, the satellite could transmit data at much higher speed for a much larger number of subscribers.

No traffic problems are consequently to be expected as regards the paging betweed the satellite and the CM exchanges located over the whole geographic surface S.

As regards the paging traffic within the range of a single area, it should be borne in mind that the transmission speed between CMs and mobile subscribers is low and that a message may have to be repeated several times for reasons of reliability.

Problems may therefore arise for the CM exchanges to handle the incoming paging traffic received from the satellite, if the exchanges are unaware of the presence of the mobile subscribers in their own areas at that particular time.

Upon receiving a paging message from the satellite, each CM exchange compares the data received from the satellite with the identification data received from the mobile subscribers who are present in the area monitored by that exchange at that particular time, and restricts its own paging to such subscribers, subject to the characteristic traffic conditions of its own area.

The invention thus achieves its objects. In particular, the proposed system allows:
the location of a mobile unit in a wide geographic surface with the possibility of extending the mobile telephone service to more than one Country;
a minimizing of the information exchanged between mobile telephone exchanges —CM— when any type of telephone connection is to be made between subscribers of which at least one is a mobile telephone subscriber.
minimizing the use of the existing telephone network, especially if the same numbering of the fixed subscribers is used for the mobile subscribers,
use of rates and recording independent of those employed for the fixed network for the traffic originating from mobile subscribers,
a minimizing of the network costs.

Solutions already in use and equivalent solutions well-known to those skilled in the art shall apply to the control and monitoring systems, message formation, types of codes to be used, etc.

Although this invention has been described with reference to specific embodiments, it is understood that the invention admits of alterations and modifications, all of which fall within the spirit of the invention.

I claim:

1. In a mobile telephone service network covering a substantial geographic surface, said mobile telephone service network including a plurality of mobile telephone exchanges and a national center, each of said plurality of mobile telephone exchanges being connected to a telephone system and controlling an assigned cell-structured mobile telephone area, and each of said plurality of mobile telephone exchanges being connected through a data transmission network to said national center; an improved mobile telephone location system comprising:

means present at each of said plurality of mobile telephone exchanges for monitoring the presence of mobile telephone units within the cell-structured mobile telephone area assigned to that mobile telephone exchange;

means present at each of said plurality of mobile telephone exchanges for transmitting a location request signal to said national center for a specified one of said mobile telephone units not present within the cell-structured mobile telephone area assigned to that mobile telephone exchange;

means present at said national center for communicating mobile telephone unit location information to each of said plurality of mobile telephone exchanges, said means for communicating being responsive to said location request signal for a specified one of said mobile telephone units to communicate mobile telephone unit locator information for said specified one of said mobile telephone units;

means present at each of said plurality of mobile telephone exchanges for signalling the presence of said specified one of said mobile telephone units within the cell-structure mobile telephone area assigned thereto when said specified one of said mobile telephone units is within the cell-structure mobile telephone area assigned thereto and said mobile telephone unit locator information for said one of said mobile telephone units has been received; and means present at each of said plurality of mobile telephone exchanges for receiving information defining the position of said specified one of said mobile telephone units as a result of a location request signal issued thereby and said means for signalling the presence and, said means for receiving acting to establish a communications channel to said specified one of said mobile telephone units.

2. The improved mobile telephone location system according to claim 1 wherein said national center includes means for connecting to a radio communications system.

3. The improved mobile telephone location system according to claim 2 wherein said radio communications system takes the form of a terrestrial radio transmission system.

4. The improved mobile telephone location system according to claim 2 wherein said radio communications system includes a geostationary satellite.

5. In a mobile telephone service network covering a substantial geographic surface, said mobile telephone service network including a plurality of mobile telephone exchanges and a national center, each of said plurality of mobile telephone exchanges being connected to a telephone system and controlling an assigned cell-structured mobile telephone area having mobile telephone units assigned thereto, and each of said plurality of mobile telephone exchanges being connected through a data transmission network to said national center; a method of locating mobile telephone units comprising the steps of:

sending mobile telephone unit identity signals from an individual mobile telephone unit in an assigned cell-structured mobile telephone area to a one of said plurality of mobile telephone exchanges to which said cell-structured mobile telephone area is assigned, said step of sending being periodically repeated at a low repetition rate and indicating presence of said individual telephone unit within a cell-structured mobile telephone area assigned to a particular one of said plurality of mobile telephone exchanges;

routing call information for a particular mobile telephone unit to an individual one of said plurality of mobile telephone exchanges to which said particular mobile telephone unit is assigned;

transmitting location request information for said particular mobile telephone unit from said individual one of said plurality of mobile telephone exchanges to said national center when said particular mobile telephone unit is absent from said assigned cell-structured mobile telephone area, said location request information identifying said particular mobile telephone unit;

issuing a location request signal from said national center to all of said plurality of mobile telephone exchanges in response to a receipt by said national center of location request information for a particular mobile telephone unit, said location request signal identifying said particular mobile telephone unit;

comparing at each of said plurality of mobile telephone exchanges mobile telephone unit identity signals representing mobile telephone units present in cell-structured mobile telephone areas assigned to each of said plurality of mobile telephone exchanges with said particular mobile telephone unit identified by said location request signal to ascertain a presence of said particular mobile telephone unit in a cell-structured mobile telephone area assigned to a certain one of said pluraity of mobile telephone exchanges;

transmitting a location signal from said certain one of said plurality of mobile telephone exchanges indicating a presence of said particular mobile telephone unit in said cell-structured mobile telephone area assigned to said certain one of said plurality of mobile telephone exchanges; and establishing a communications channel from said individual one of said plurality of mobile telephone exchanges to said certain one of said plurality of mobile telephone exchanges in response to said location signal, said communications channel for further routing call information to said particular mobile telephone unit through said certain one of said plurality of mobile telephone exchanges.

* * * * *